United States Patent [19]

Dixon et al.

[11] Patent Number: 5,560,681
[45] Date of Patent: Oct. 1, 1996

[54] SEAT BOTTOM EXTENSION MECHANISM FOR PASSENGER SEATS

[75] Inventors: Richard W. Dixon; Tommy G. Plant, both of Winston-Salem; Ralph J. Nolan, Jr., Mt. Airy, all of N.C.

[73] Assignee: Burns Aerospace Corporation, Winsont-Salem, N.C.

[21] Appl. No.: 407,621

[22] Filed: Mar. 21, 1995

[51] Int. Cl.$^6$ ..................................................... A47C 3/025
[52] U.S. Cl. ................................. 297/284.11; 297/423.26
[58] Field of Search ..................................... 297/248, 257, 297/284.1, 284.3, 284.11, 337, 341, 342, 311, 423.26, 423.2

[56] References Cited

U.S. PATENT DOCUMENTS

| | | | |
|---|---|---|---|
| 3,239,271 | 3/1966 | Bergersen | 297/423.2 X |
| 3,833,257 | 9/1974 | Dove | 297/284 |
| 3,883,173 | 5/1975 | Shepard et al. | 297/423.26 X |
| 4,410,215 | 10/1983 | McKean et al. | 297/423.26 X |
| 5,171,062 | 12/1992 | Courtois | 297/284.11 X |
| 5,352,020 | 10/1994 | Wade et al. | 297/423.26 |
| 5,366,272 | 11/1994 | Lebrun | 297/284.11 |

FOREIGN PATENT DOCUMENTS

| | | | |
|---|---|---|---|
| 3618673 | 12/1987 | Germany | 297/284.11 |
| 2239792 | 7/1991 | United Kingdom | 297/284.11 |

*Primary Examiner*—Milton Nelson, Jr.
*Attorney, Agent, or Firm*—W. Thad Adams, III, P.A.

[57] ABSTRACT

A seat having a seat frame mounting a seat bottom, a seat back extending upwardly from the back of the seat bottom and a leg rest extending downwardly in an area forward of a front side of the seat bottom. The seat includes the combination of a seat bottom extension for increasing or decreasing the length of the seat bottom between the seat back and the leg rest to fit the distance between the buttocks and the back of the knees of the occupant. The seat bottom extension has a seat bottom extension assembly on which the leg rest is mounted for movement therewith and an adjustment assembly for adjustably mounting the seat bottom extension assembly to the front side of the seat bottom. The seat bottom extension is mounted for incremental movement between a first position wherein the seat bottom extension is retracted to a position adjacent the front side of the seat bottom and a second position wherein the seat bottom extension is extended to a position spaced apart from the front side of the seat bottom to thereby increase the length of the seat bottom between the seat back and the leg rest to fit the distance between the buttocks and the back of the knees of the occupant.

16 Claims, 7 Drawing Sheets

SEAT BOTTOM EXTENSION MECHANISM FOR PASSENGER SEATS

TECHNICAL FIELD AND BACKGROUND OF THE INVENTION

This invention relates to a seat bottom extension mechanism for seats, such as aircraft passenger seats of the type found in transport aircraft. The seat has application in seats of other types as well. The seat bottom extension assembly mechanism permits adjustment of the seat bottom to offer support to the backs of the legs and knees of both relatively large and small occupants by varying the distance between the seat bottom at the bottom of the seat back (referred to as the "seat reference point" or "SRP, See, SAE Aerospace Standard AS8049, issued 1990-07, entitled "Performance Standard for Seats in Civil Rotorcraft and Transport Airplanes" ("Aerospace Standard" at 6, FIG. 1A) and the back of the knees. In so doing, the thighs of the occupant are supported along substantially the entire length from the "buttocks reference point" or "BRP" to the knee, yet the leg is permitted to bend naturally at the knee.

In the case of relatively short occupants, the seat bottom extension assembly is used in the retracted position, permitting the legs to bend naturally at the knee rather than being held in a partially unbent position by the retracted leg rest. In the case of relatively tall occupants, the seat bottom extension assembly extends, permitting the calves of the legs to be supported by the leg rest.

Substantial effort has been devoted to seat back and seat bottom design in order to promote both safety and comfort. However, prior art seats, particularly passenger seats such as aircraft passenger seats have not previously taken fully into account the length of the legs in optimizing seat comfort.

SUMMARY OF THE INVENTION

Therefore, it is an object of the invention to provide a seat bottom extension assembly mechanism which permits adjustment of the distance between the back of the seat bottom at the seat back and the leg rest to provide support for the upper and lower leg of the occupant.

It is another object of the invention to provide a seat bottom extension assembly mechanism which permits adjustment of the distance between the back of the seat bottom at the seat back and the leg rest to permit the occupant to sit with legs naturally bent at the knee.

It is another object of the invention to provide a seat bottom extension assembly mechanism which is incrementally adjustable between a range of movement to accommodate occupant safety and comfort.

It is another object of the invention to provide a seat bottom extension assembly mechanism which is easily adjustable by the occupant while seated.

It is another object of the invention to provide a seat bottom extension assembly which is particularly adapted for use on an aircraft passenger seat.

These and other objects of the present invention are achieved in the preferred embodiments disclosed below by providing a seat having a seat frame mounting a seat bottom, a seat back extending upwardly from the back of the seat bottom and a leg rest extending downwardly in an area forward of a front side of the seat bottom. The seat includes a seat bottom extension means for increasing or decreasing the length of the seat bottom between the seat back and the leg rest to fit the distance between the buttocks and the back of the knees of the occupant. The seat bottom extension means comprises a seat bottom extension assembly on which the leg rest is mounted for movement therewith, and adjustment means for adjustably mounting the seat bottom extension assembly to the front side of the seat bottom for incremental movement between a first position wherein the seat bottom extension assembly is retracted to a position adjacent the front side of the seat bottom and a second position wherein the seat bottom extension assembly is extended to a position spaced apart from the front side of the seat bottom to thereby increase the length of the seat bottom between the seat back and the leg rest to fit the distance between the buttocks and the back of the knees of the occupant.

According to one preferred embodiment of the invention, the adjustment means comprises translation means for permitting translating movement of the seat bottom extension assembly relative to the seat bottom and actuator means for permitting the occupant to initiate, determine the increment of adjustment desired, and terminate the adjustment process.

According to another preferred embodiment of the invention, the translation means comprises a guide tube carried by one of the seat bottom or the seat bottom extension and a rail carried by the other of the seat bottom or the seat bottom extension assembly and positioned in the guide tube for rolling movement therewith.

According to yet another preferred embodiment of the invention, the guide tube is carried by the seat bottom and the guide rail is carried by the seat bottom extension.

According to yet another preferred embodiment of the invention, the guide means comprises first and second guide tubes carried by one of the seat bottom or the seat bottom extension assembly in spaced-apart relation to each other and first and second rails carried by the other of the seat bottom or the seat bottom extension assembly and positioned in respective first and second guide tubes for rolling movement therewith.

According to yet another preferred embodiment of the invention, the first and second guide tubes are carried by the seat bottom and the first and second guide rails are carried by the seat bottom extension.

According to yet another preferred embodiment of the invention, the actuator means comprises a control button carried on an arm rest of the seat for access by the occupant and a telescoping actuator cylinder controlled by the control button. The actuator cylinder is attached by one end thereof to the seat bottom and by the other end thereof to the seat bottom extension assembly.

According to yet another preferred embodiment of the invention, the seat bottom extension assembly includes an actuator arm pivotally mounted adjacent one end thereof to the seat bottom and including an opposing free end attached to the seat bottom extension assembly for moving the seat bottom extension assembly in response to pivotal movement of the pivot arm.

According to yet another preferred embodiment of the invention, the seat bottom extension assembly includes a bracket having an elongate slot therein, and the free end of the actuator arm includes a roller bearing captured in the slot for rolling movement to thereby move the seat bottom extension assembly.

According to yet another preferred embodiment of the invention, the seat bottom extension mechanism includes stabilizing means for stabilizing the seat bottom extension assembly both during movement and while stationary.

According to yet another preferred embodiment of the invention, the leg rest is moveable from a stowed position against a front face of the seat below the front side of the seat bottom to an elevated position for supporting the legs and feet of the occupant in an elevated position.

According to yet another preferred embodiment of the invention, two of the seats are connected together side-to-side to form a seat set.

According to yet another preferred embodiment of the invention, the seat comprises an aircraft passenger seat.

According to yet another preferred embodiment of the invention, the seat bottom includes a seat pan, and the guide tubes are carried on opposing sides of the seat pan.

According to yet another preferred embodiment of the invention, the stabilizing means comprises first and second guide brackets positioned on the seat bottom in respective fore and aft positions. Each of the guide brackets have a guide hole therein in axial alignment with each other. An elongate guide rod is mounted to the seat bottom extension assembly and extends rearwardly towards the seat bottom. The rod is positioned in the guide hole in both the first and second guide brackets for sliding movement therein as the seat bottom extension assembly is adjusted.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED
EMBODIMENT AND BEST MODE

Figure 1:
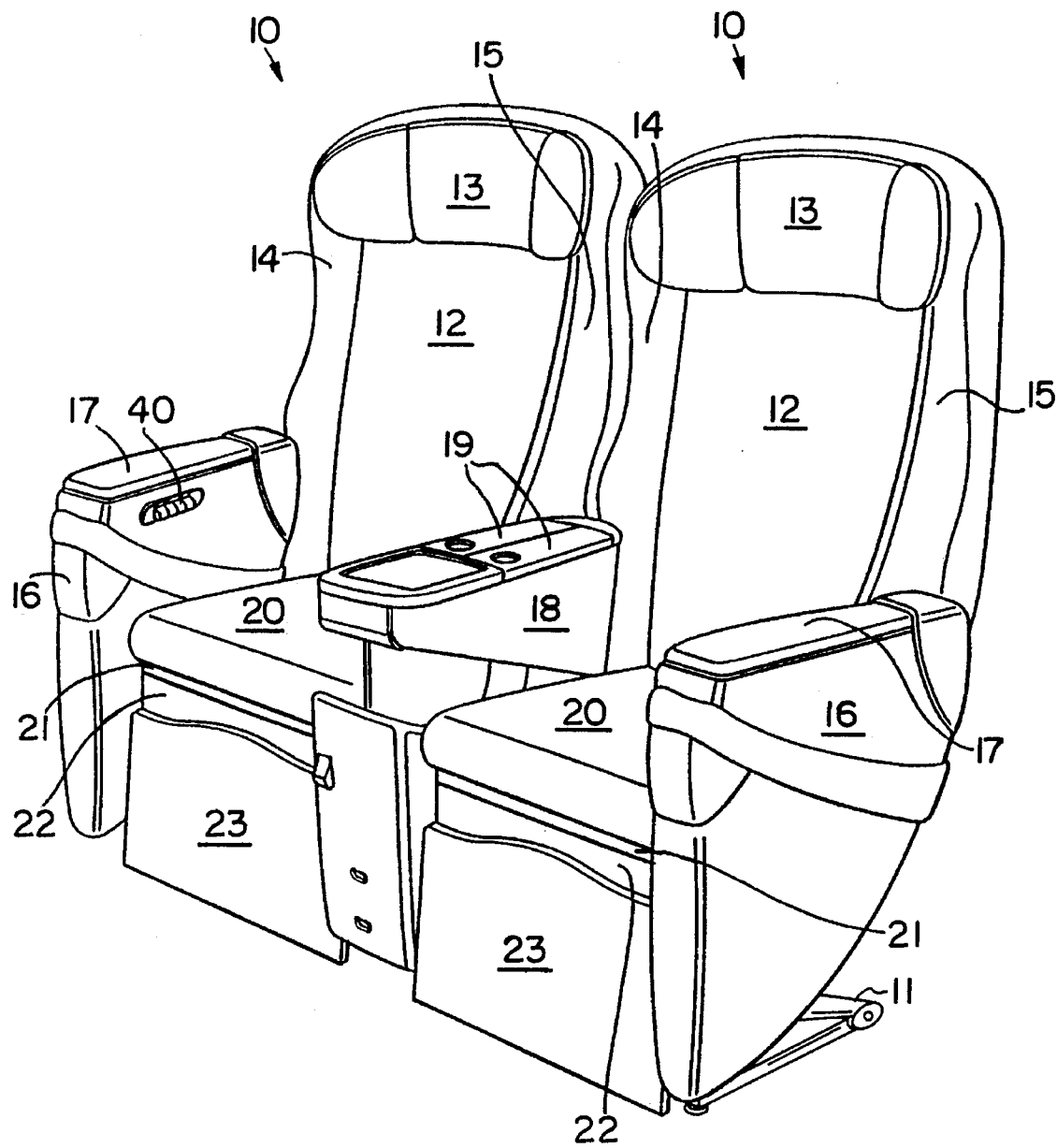
FIG. 1 is a overall perspective view of a set of two-seats according to an embodiment of the invention.

Referring now specifically to the drawings, two seats according to the present invention is illustrated in FIG. 1 and shown generally at reference numeral 10. The two seats 10 collectively make up a transport aircraft seat set, in which the two seats 10 share a center console which includes a snack/drink tray and arm rests. Since the two seats 10 are identical in all relevant features, the description will continue with reference to a single seat 10.

Seat 10 includes a seat frame 11 which supports the other seat components, and which permits the seat 10 to be anchored by track fittings to a track attached to the deck of the aircraft. Seat 10 also includes a cushioned, upholstered seat back 12 with a headrest 13 and two side bolsters 14 and 15 for providing lateral support for the occupant. An outboard arm rest assembly 16 provides side support to the lower torso and legs of the seat occupant, as well as an arm rest 17 for resting the lower arm and hand. As noted above, a center console 18 provides inboard side support the lower torso and legs of the seat occupant, as well as an arm rest 19 for resting the other lower arm and hand.

Seat 10 also includes a cushioned, upholstered seat bottom 20. The lower, structural portion of the seat bottom 20, called a "seat pan" is carried by the seat frame 11 and supports the buttocks and upper legs of the occupant. A seat bottom extension assembly 21 according to an embodiment of the invention is mounted for movement on the seat bottom 20. A leg rest 22 is mounted for pivotal movement between a lowered (shown) and a raised (not shown) position, so that the occupant can sit relatively upright with the lower legs and feet lowered or elevated. A foot rest 23 is pivotally carried by the lower end of the leg rest 22. Foot rest 23 is shown in the raised position in FIGS. 1, 2 and 3, and in lowered position supporting the feet in FIGS. 6 and 7.

Figure 2:
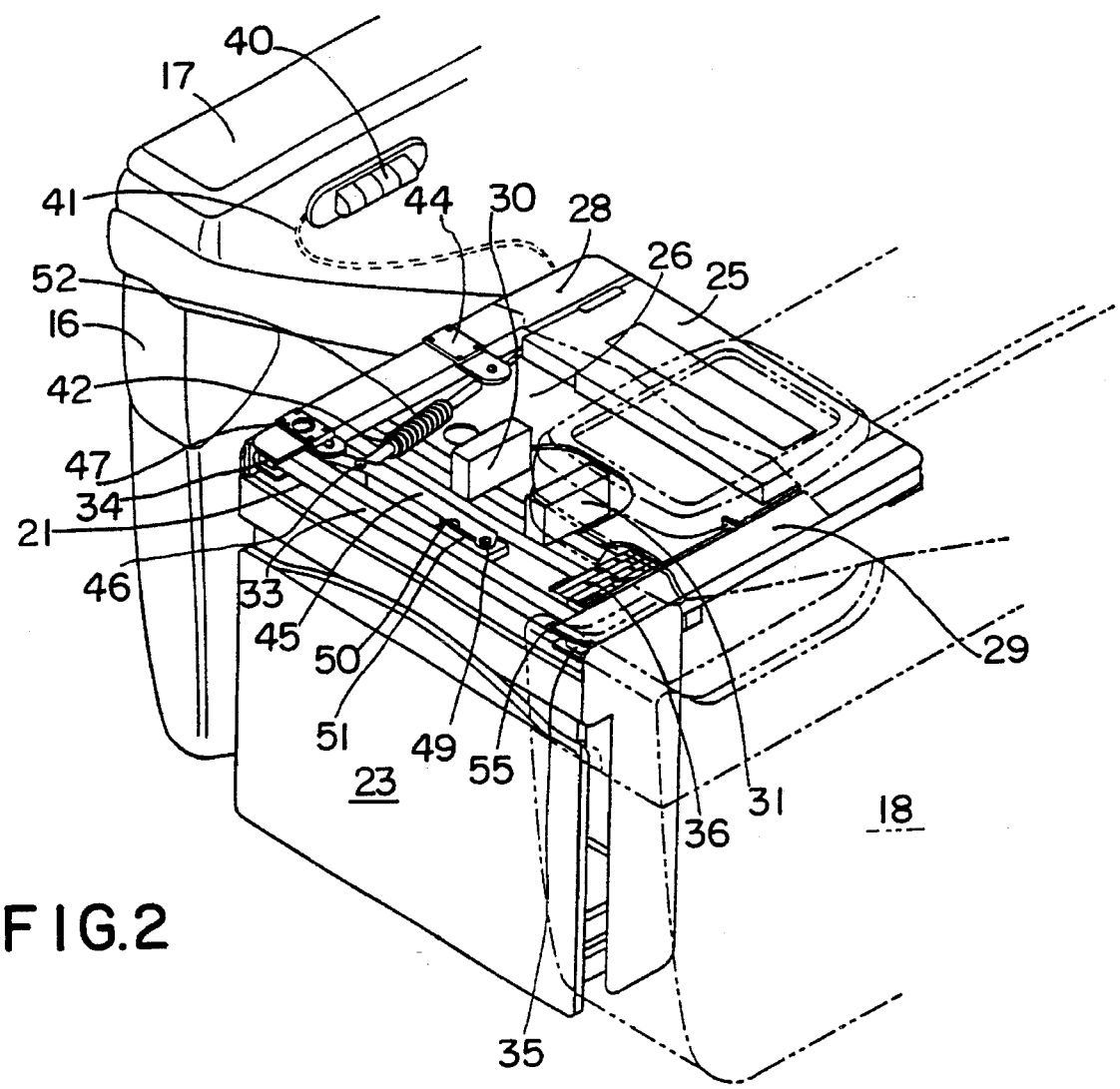
FIG. 2 is an enlarged fragmentary view, with parts broken away for clarity, of one of the seats shown in FIG. 1.

Referring now to FIG. 2, the seat bottom 20 is shown with the upholstered cushion removed. Seat bottom 20 includes top and bottom vertically-spaced aluminum sheet assemblies 25 and 26. The top sheet 25 forms the top of the seat bottom and directly supports the upholstered seat cushion. Top and bottom sheet assemblies 25 and 26 are spaced-apart by two seat frame members 28 and 29. Seat frame members 28 and 29 have a channeled cross-section and form guide tubes for the seat bottom extension assembly 21, as described below. The space defined between the top and bottom sheet assemblies 25 and 26 contain operating components of the seat 10, as described in further detail below. Spacers 30 and 31 provide support to the top sheet assembly 25 in order to maintain proper vertical spacing in the middle of the seat bottom 20 under load from the seated occupant.

Figure 4:
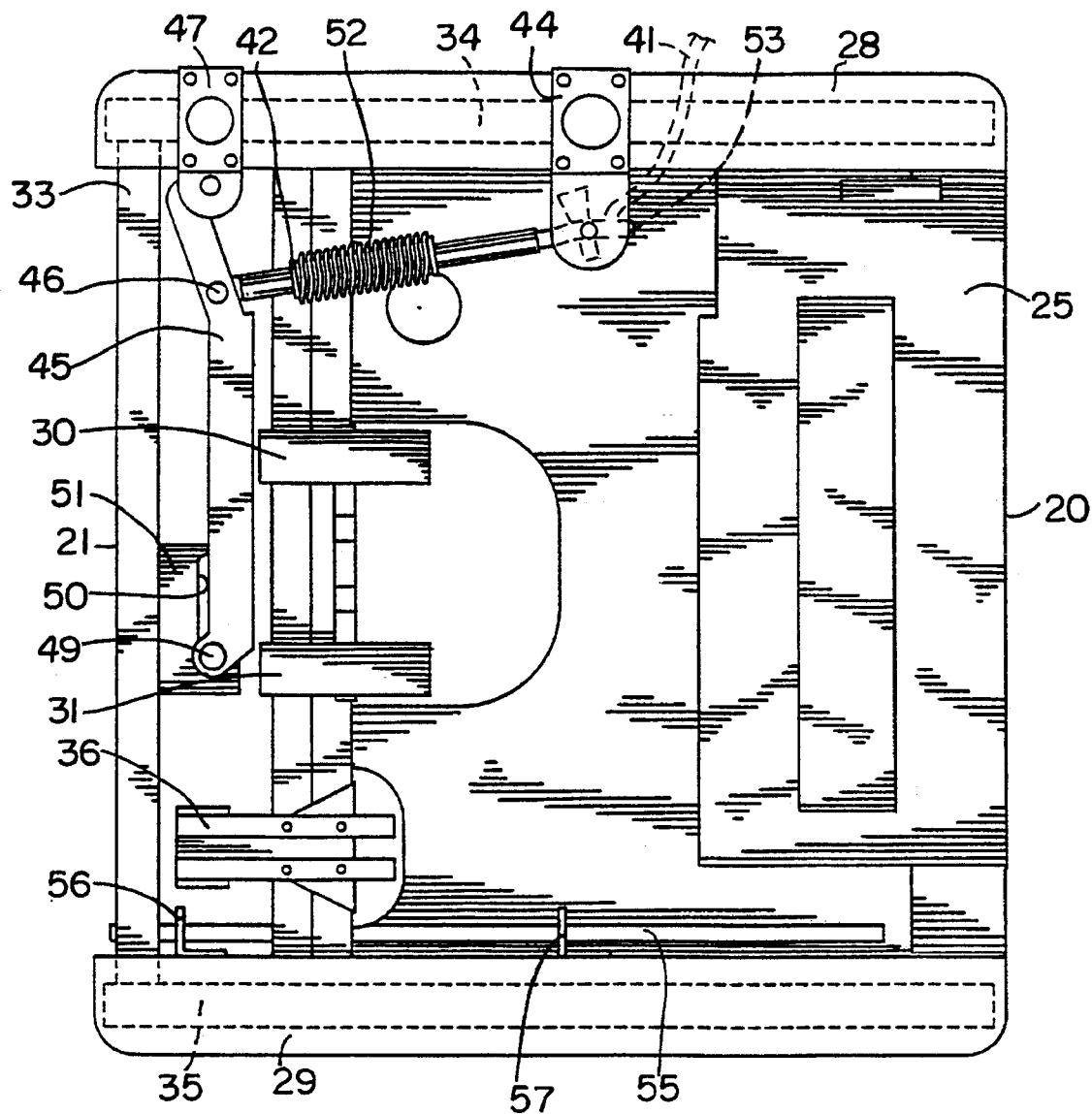
FIG. 4 is a simplified top plan view, with parts removed for clarity, of the seat pan and seat bottom extension of the seat according to an embodiment of the invention, with the seat bottom extension in its retracted position.
Figure 5:
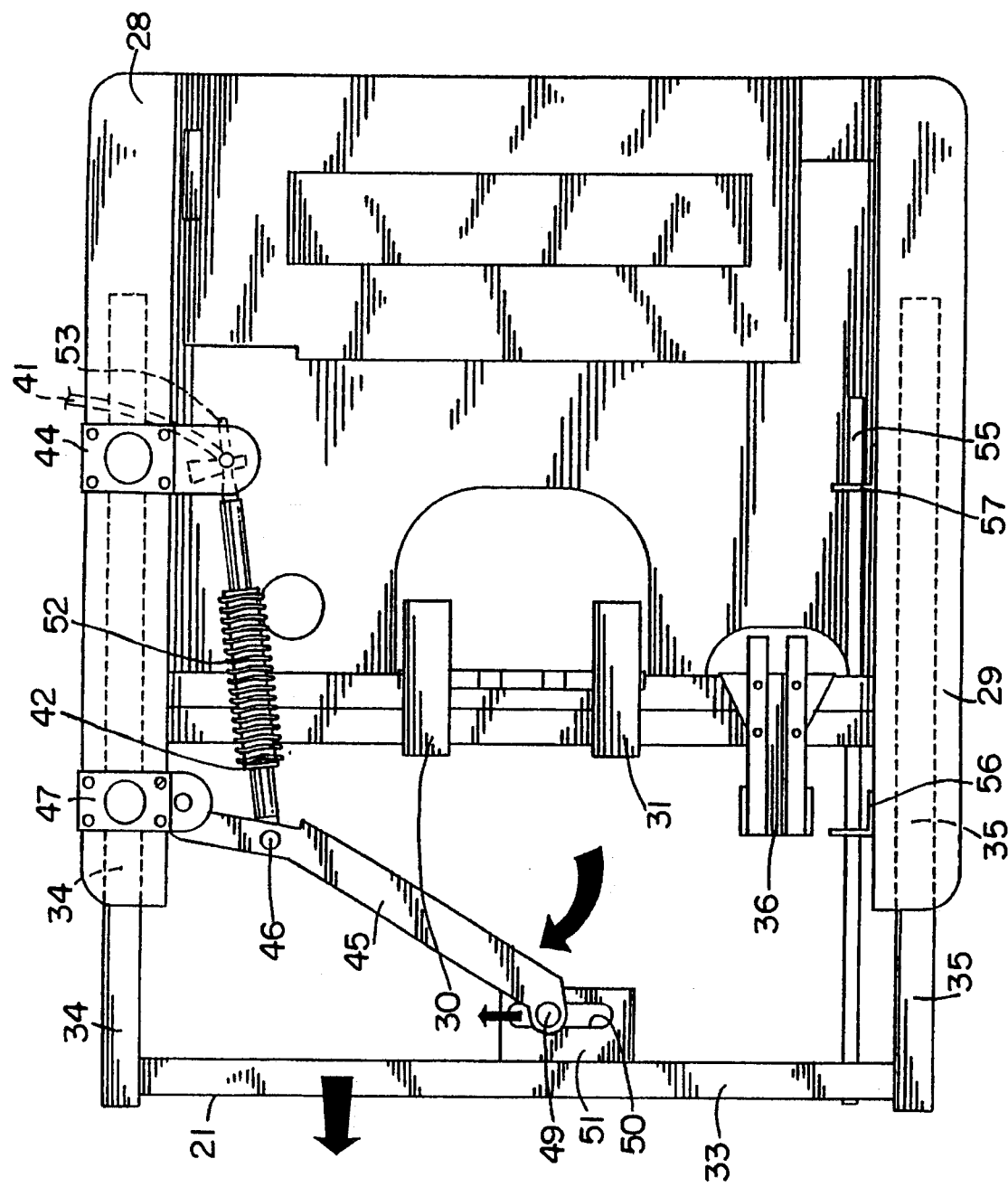
FIG. 5 is a view similar to FIG. 4 with the seat bottom extension in its extended position.

Referring now to FIGS. 4 and 5, the seat bottom extension assembly 21 includes a cross-frame member 33 which extends laterally from side-to-side across the width of the seat bottom 20. First and second guide rails 34 and 35 nest in the seat frame members 28 and 29 and are mounted for rolling, telescoping movement between a retracted position shown in FIG. 4, and an extended position shown in FIG. 5. Roller guide bearings (not shown) are positioned in the frame members 28 and 29 and permit a smooth, low-friction movement of the guide rails 34 and 35 in and out of the frame members 28 and 29.

A lock 36 locks the seat bottom extension assembly 21 in its retracted position, and unlocks the extension assembly 21 to permit deployment when a control button 40 is depressed. Leg rest 22 is mounted for pivotal movement between a raised and lowered position on guide rails 34 and 35.

Figure 3:
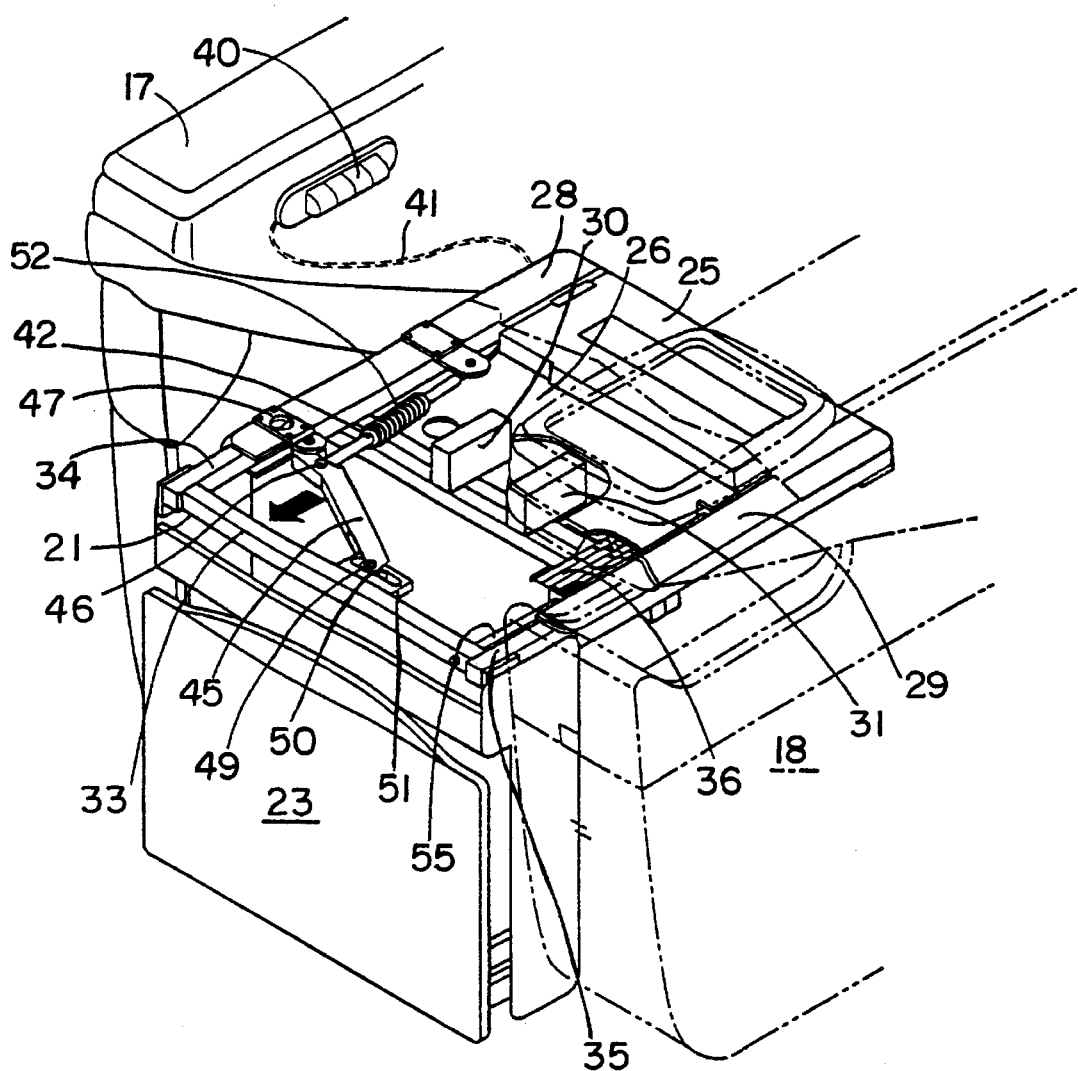
FIG. 3 is a view similar to FIG. 2 showing the seat with the seat bottom extension in its extended position.

Movement of the seat bottom extension assembly 21 between its extended and retracted position is actuated by the occupant-controlled control button 40, as is shown in FIGS. 1, 2, and 3, and as mentioned above in relation to the lock 36. Button 40 is connected by a control cable 41 (FIGS. 2 and 3) to a hydraulic actuator cylinder 42. As is best shown in FIGS. 4 and 5, actuator cylinder 42 is mounted by one end to a bracket 44 carried by seat frame member 28, and by the other end to an actuator arm 45. Actuator cylinder 42 is pivotally mounted to actuator arm 45 by a pivot pin 46.

Actuator arm 45 is pivotally mounted to a bracket 47 carried by seat frame member 28. A roller bearing 49 carried on the end of the actuator arm 45 is captured in a slot 50 in a guide bracket 51 mounted on the rear side of the cross-frame member 33.

Actuator cylinder 42 includes an outer coil spring 52 and a pivoted control head 53. The control head 53 cooperates with an interior valve (not shown) of the cylinder 42 for controlling the free exchange of fluid between telescoping members of the cylinder 42. When the control head 53 is pivoted by actuation of the control button 40, the valve opens and allows fluid flow within the cylinder 42, thereby permitting inward and outward telescoping movement. The force of the spring 52 acts to extend the telescoping cylinder 42. The actuator arm 45 is pivoted forwardly. The pivoting forward motion of the actuator arm 45 is translated by the bearing 49 in slot 50 of bracket 51 into pure forward motion of the seat bottom extension assembly 21 into the extended position shown in FIG. 5.

If the occupant pushes backwardly with the calves of the legs on the seat bottom extension assembly 21 against the extending force of the spring 32, the cylinder 42 is retracted and the seat bottom extension assembly 21 is moved into the retracted position shown in FIG. 4.

A guide rod 55 is attached to the cross-frame member 33 and extends rearwardly into the space between the top and bottom sheet assemblies 25 and 26. Rod 55 is positioned for sliding in-and-out movement with movement of the cross-frame member 33 through a pair of spaced-apart brackets 56 and 57. Each of the brackets 56 and 57 have holes just large enough to permit non-binding sliding movement of the rod 55. The brackets 56 and 57 are spaced sufficiently apart to require that the rod be aligned with the holes in both brackets to move freely. Rod 55 stabilizes the seat bottom extension assembly 21 by reducing the tendency of the guide rails 34 and 35 to rack in the tubes of the seat frame members 28 and 29.

Figure 6:
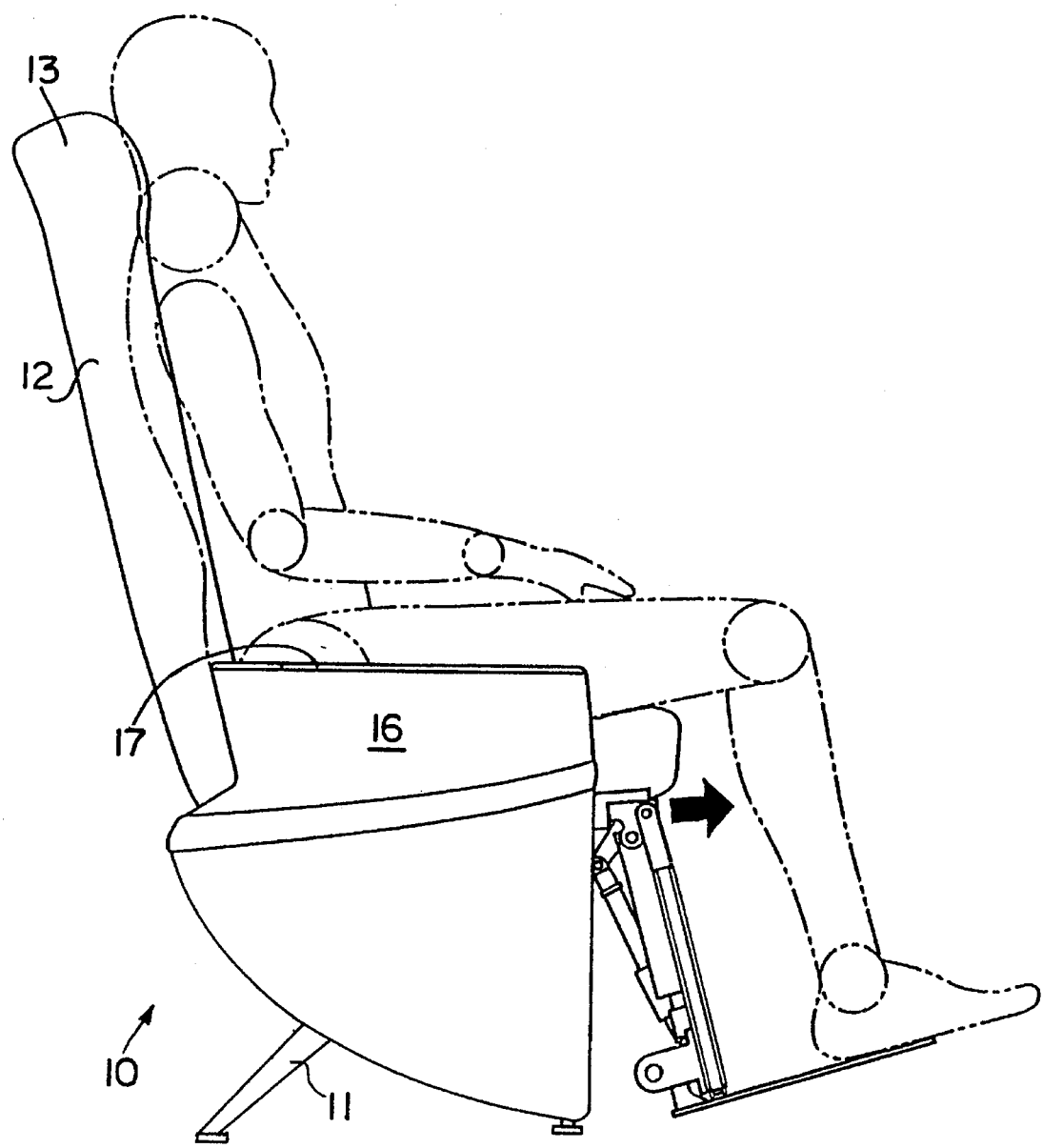
FIG. 6 is a side elevation of a seat according to FIG. 1 with the seat bottom extension assembly in its retracted position.

Referring now to FIG. 6, a passenger is shown seated in seat 10, with the seat bottom extension assembly 21 in its retracted position. This position is not suitable for the particular passenger. While the feet are properly placed on the foot rest 23, the knees extend outwardly, requiring the lower legs to extend outwardly away from the surface of the leg rest 22.

Figure 7:
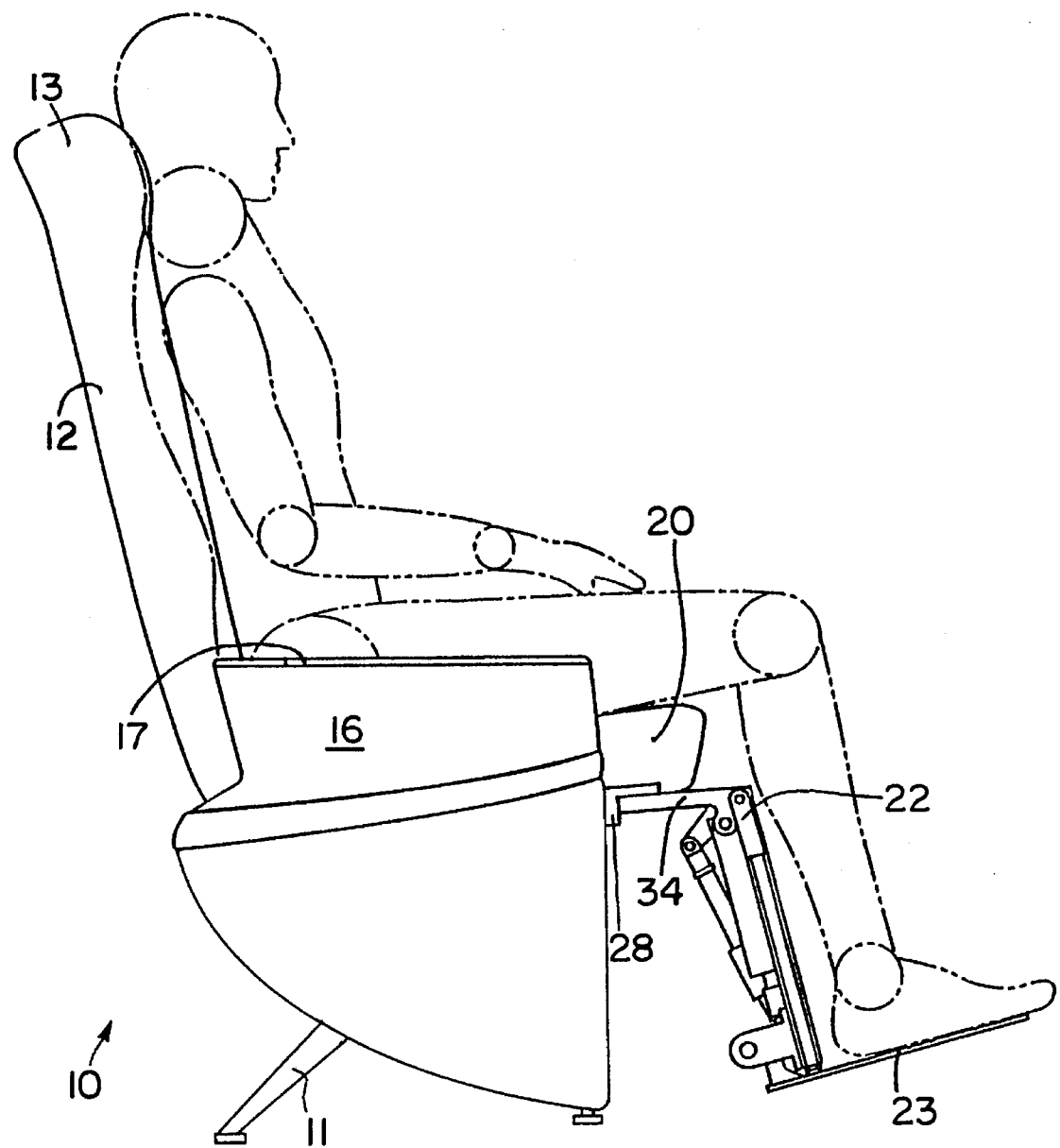
FIG. 7 is a side elevation similar to FIG. 6 showing the seat bottom extension assembly in its extended position.

As is shown in FIG. 7, adjustment of the seat bottom extension assembly 21 as described above pushes the leg rest 22 outwardly, thus providing support to the back of the lower legs of the passenger. This results in a more comfortable seating position, whether the leg rest 22 is in its elevated or lowered position.

A seat with a seat bottom extension assembly is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. In a seat having a seat frame mounting a seat bottom, a seat back extending upwardly from the back of the seat bottom, and a leg rest extending downwardly in an area forward of a front side of the seat bottom, a combination of seat bottom extension means for selectively increasing and decreasing the length of the seat bottom between the seat back and the leg rest to fit the distance between an occupant's buttocks and the back of the knees of the occupant, said seat bottom extension means comprising:

(a) a seat bottom extension assembly on which said leg rest is mounted for movement therewith;

(b) adjustment means for adjustably mounting said seat bottom extension assembly to the front side of the seat bottom for incremental movement between a first position wherein said seat bottom extension assembly is retracted to a position adjacent the front side of said seat bottom and a second position wherein said seat bottom extension assembly is extended to a position spaced apart from the front side of said seat bottom to thereby increase the distance between the seat back and the leg rest to fit the distance between the buttocks and the back of the knees of the occupant, said adjustment means comprising:

(c) translation means for permitting translating movement of said seat bottom extension assembly relative to said seat bottom, said translation means comprising:
        i) a guide channel carried by one of the seat bottom or the seat bottom extension assembly; and
        (ii) a rail carried by the other of the seat bottom or the seat bottom extension assembly and positioned in said guide channel for sliding movement therein; and (d) actuator means for permitting the occupant to initiate, determine the increment of adjustment desired, and terminate the adjustment process.

2. In a seat according to claim 1, wherein said guide channel is carried by said seat bottom and said rail is carried by said seat bottom extension assembly.

3. In a seat according to claim 1, wherein said translation means comprises:

(a) said first and a second guide channel carried by one of the seat bottom or the seat bottom extension assembly in spaced-apart relation to each other;

(b) roller means positioned in said guide channels; and (c) said first and a second rail carried by the other of the seat bottom or the seat bottom extension assembly and positioned in respective said first and second said guide channels for rolling movement therein on said roller means.

4. In a seat according to claim 1 and including stabilizing means for stabilizing the seat bottom extension assembly both during movement and while stationary.

5. In a seat according to claim 1, wherein said leg rest is moveable from a stowed position against a front face of the seat below the front side of the seat bottom to an elevated position for supporting the legs and feet of the occupant in an elevated position.

6. In a seat according to claim 1, wherein two of said seats are connected together side-to-side to form a seat set.

7. In a seat according to claim 1, wherein said seat comprises an aircraft passenger seat.

8. In a seat having a seat frame mounting a seat bottom, a seat back extending upwardly from the back of the seat bottom, and a leg rest extending downwardly in an area forward of a front side of the seat bottom, a combination of seat bottom extension means for selectively increasing and decreasing the length of the seat bottom between the seat back and the leg rest to fit the distance between an occupant's buttocks and the back of the knees of the occupant, said seat bottom extension means comprising:

a) a seat bottom extension assembly on which said leg rest is mounted for movement therewith;

(b) adjustment means for adjustably mounting said seat bottom extension assembly to the front side of the seat bottom for incremental movement between a first position wherein said seat bottom extension assembly is retracted to a position adjacent the front side of said seat bottom and a second position wherein said seat bottom extension assembly is extended to a position spaced apart from the front side of said seat bottom to thereby increase the distance between the seat back and the leg rest to fit the distance between the buttocks and the back of the knees of the occupant, said adjustment means comprising:

(c) translation means for permitting translating movement of said seat bottom extension assembly relative to said seat bottom, said translation means comprising:
  (i) first and second guide channels carried by the seat bottom in spaced-apart relation to each other; and
  (ii) first and second rails carried by the seat bottom extension assembly and positioned in respective first and second said guide channels for sliding movement therein; and
(d) actuator means for permitting the occupant to initiate, determine the increment of adjustment desired, and terminate the adjustment process; and
(e) wherein said seat bottom includes a seat pan, and said guide channels are carried on opposing sides of said seat pan.

9. In a seat having a seat frame mounting a seat bottom, a seat back extending upwardly from the back of the seat bottom, and a leg rest extending downwardly in an area forward of a front side of the seat bottom, a combination of seat bottom extension means for selectively increasing and decreasing the length of the seat bottom between the seat back and the leg rest to fit the distance between an occupant's buttocks and the back of the knees of the occupant, said seat bottom extension means comprising:
  (a) a seat bottom extension assembly on which said leg rest is mounted for movement therewith:
  (b) adjustment means for adjustably mounting said seat bottom extension assembly to the front side of the seat bottom for incremental movement between a first position wherein said seat bottom extension assembly is retracted to a position adjacent the front side of said seat bottom and a second position wherein said seat bottom extension assembly is extended to a position spaced apart from the front side of said seat bottom to thereby increase the distance between the seat back and the leg rest to fit the distance between the buttocks and the back of the knees of the occupant, said adjustment means comprising:
    (i) translation means for permitting translating movement of said seat bottom extension assembly relative to said seat bottom;
    (ii) actuator means for permitting the occupant to initiate, determine the increment of adjustment desired, and terminate the adjustment process;
  (e) stabilizing means for stabilizing the seat bottom extension assembly both during movement and while stationary, wherein said stabilizing means comprises:
    (i) first and second guide brackets positioned on said seat bottom in respective fore and aft position, each of said guide brackets having a guide hole therein in axial alignment with each other; and
    (ii) an elongate guide rod mounted to said seat bottom extension assembly and extending rearwardly towards said seat bottom, said rod positioned in the guide hole in both said first and second guide brackets for sliding movement therein as said seat bottom extension assembly is adjusted.

10. In a seat having a seat frame mounting a seat bottom, a seat back extending upwardly from the back of the seat bottom, and a leg rest extending downwardly in an area forward of a front side of the seat bottom, a combination of seat bottom extension means for selectively increasing and decreasing the length of the seat bottom between the seat back and the leg rest to fit the distance between an occupant's buttocks and the back of the knees of the occupant, said seat bottom extension means comprising:
  (a) a seat bottom extension assembly on which said leg rest is mounted for movement therewith;
  (b) adjustment means for adjustably mounting said seat bottom extension assembly to the front side of the seat bottom for incremental movement between a first position wherein said seat bottom extension assembly is retracted to a position adjacent the front side of said seat bottom and a second position wherein said seat bottom extension assembly is extended to a position spaced apart from the front side of said seat bottom to thereby increase the distance between the seat back and the leg rest to fit the distance between the buttocks and the back of the knees of the occupant, said adjustment means comprising:
  (c) translation means for permitting translating movement of said seat bottom extension assembly relative to said seat bottom; said translation means comprising guide means including:
    (i) first and second guide channels carried by one of the seat bottom or the seat bottom extension assembly in spaced-apart relation to each other; and
    (ii) first and second rails carried by the other of the seat bottom or the seat bottom extension assembly and positioned in respective first and second said guide channels for sliding movement therein; and
  (d) actuator means for permitting the occupant to initiate, determine the increment of adjustment desired, and terminate the adjustment process.

11. In a seat according to claim 10, wherein said first and second guide channels are carried by said seat bottom and said first and second guide rails are carried by said seat bottom extension assembly.

12. In a seat according to claim 1, wherein said actuator means comprises:
  (a) a control button carried on an armrest of the seat for access by the occupant;
  (b) a telescoping actuator cylinder controlled by said control button, said actuator cylinder attached by one end thereof to said seat bottom and by the other end thereof to said seat bottom extension assembly.

13. In a seat having a seat frame mounting a seat bottom, a seat back extending upwardly from the back of the seat bottom, and a leg rest extending downwardly in an area forward of a front side of the seat bottom, a combination of seat bottom extension means for selectively increasing and decreasing the length of the seat bottom between the seat back and the leg rest to fit the distance between an occupant's buttocks and the back of the knees of the occupant, said seat bottom extension means comprising:
  (a) a seat bottom extension assembly on which said leg rest is mounted for movement therewith;
  (b) adjustment means for adjustably mounting said seat bottom extension assembly to the front side of the seat bottom for incremental movement between a first position wherein said seat bottom extension assembly is retracted to a position adjacent the front side of said seat bottom and a second position wherein said seat bottom extension assembly is extended to a position spaced apart from the front side of said seat bottom to thereby increase the distance between the seat back and the leg rest to fit the distance between the buttocks and the back of the knees of the occupant, said adjustment means comprising:
  (c) translation means for permitting translating movement of said seat bottom extension assembly relative to said seat bottom; and (d) actuator means for permitting the occupant to initiate, determine the increment of adjustment desired, and terminate the adjustment process, wherein said actuator means comprises:
  (i) a control button carried on an armrest of the seat for access by the occupant;
  (ii) a telescoping actuator cylinder controlled by said control button, said actuator cylinder attached by one end thereof to said seat bottom and by the other end thereof to said seat bottom extension assembly.

14. In a seat having a seat frame mounting a seat bottom, a seat back extending upwardly from the back of the seat bottom, and a leg rest extending downwardly in an area forward of a front side of the seat bottom, wherein said leg rest is moveable from a stowed position against a front face of the seat below the front side of the seat bottom to an elevated position for supporting on legs and feet of the occupant in an elevated position, a combination of seat bottom extension means for selectively increasing and decreasing the length of the seat bottom between the seat back and the leg rest to fit the distance between the buttocks and the back of the knees of the occupant, said seat bottom extension means comprising:
  (a) a seat bottom extension assembly on which said leg rest is mounted for movement therewith;
  (b) adjustment means for adjustably mounting said seat bottom extension assembly to the front side of the seat bottom for incremental movement between a first position wherein said seat bottom extension assembly is retracted to a position adjacent the front side of said seat bottom and a second position wherein said seat bottom extension assembly is extended to a position spaced apart from the front side of said seat bottom to thereby increase the distance between the seat back and the leg rest to fit the distance between the buttocks and the back of the knees of the occupant, said adjustment means comprising:
  (c) translation means for permitting translating movement of said seat bottom extension assembly relative to said seat bottom; and
  (d) actuator means for permitting the occupant to initiate, determine the increment of adjustment desired, and terminate the adjustment process.

15. In a seat according to claim 14, wherein said seat bottom extension assembly includes an actuator arm pivotally mounted adjacent one end thereof to said seat bottom and including an opposing free end attached to said seat bottom extension assembly for moving said seat bottom extension assembly in response to pivotal movement of said actuator arm.

16. In a seat according to claim 15, wherein said seat bottom extension assembly includes a bracket having an elongate slot therein, and the free end of said actuator arm includes a roller bearing captured in said slot for rolling movement to thereby move the seat bottom extension assembly.

* * * * *